United States Patent [19] [11] 4,145,377
Bussink et al. [45] Mar. 20, 1979

[54] COMPOSITION OF A POLYPHENYLENE ETHER, A STYRENE RESIN, A PRECOMPOUNDED POLYMER SYSTEM AND A BLOCK COPOLYMER OF A VINYL AROMATIC COMPOUND AND AN OLEFINIC ELASTOMER

[75] Inventors: Jan Bussink, Bergen op Zoom; Johannes W. J. de Munck, Huybergen, both of Netherlands

[73] Assignee: General Electric Company, Pittsfield, Mass.

[21] Appl. No.: 747,327

[22] Filed: Dec. 3, 1976

[51] Int. Cl.$^2$ ............................................. C08L 53/02
[52] U.S. Cl. ............................... 260/876 B; 260/880 B
[58] Field of Search ............... 260/874, 876 R, 876 B, 260/880 B

[56] References Cited
U.S. PATENT DOCUMENTS

| | | | |
|---|---|---|---|
| 3,299,174 | 1/1967 | Kuhre et al. | 260/876 |
| 3,333,024 | 7/1967 | Haefele et al. | 260/880 B |
| 3,465,063 | 9/1969 | Hassell et al. | 260/876 B |
| 3,810,957 | 5/1974 | Lunk | 260/876 B |
| 3,835,200 | 9/1974 | Lee | 260/876 B |
| 3,883,613 | 5/1975 | Cooper | 260/874 |
| 3,994,856 | 11/1976 | Katchman et al. | 260/876 B |

Primary Examiner—Hosea E. Taylor
Assistant Examiner—Amelia B. Yarbrough
Attorney, Agent, or Firm—Morgan, Finnegan, Pine, Foley & Lee

[57] ABSTRACT

There are provided compositions comprising (a) a polyphenylene ether; (b) a polystyrene resin; (c) a precompounded polymer system comprising an olefinic resin and an elastomeric block copolymer alone, or in further combination with a dispersing agent; and (d) an elastomeric block copolymer resin. The use of (c) and (d) together provides, surprisingly, higher impact strength over the entire composition range of (a) to (b), with lower amounts of (c) and (d), based on the total resinous components of the system, being required.

21 Claims, No Drawings

COMPOSITION OF A POLYPHENYLENE ETHER, A STYRENE RESIN, A PRECOMPOUNDED POLYMER SYSTEM AND A BLOCK COPOLYMER OF A VINYL AROMATIC COMPOUND AND AN OLEFINIC ELASTOMER

This invention relates to novel resin compositions and more particularly, to polymer compositions comprising a polyphenylene ether, a styrene resin, a precompounded blend of an olefinic resin and an elastomeric block copolymer of a vinyl aromatic compound and an olefinic elastomer, alone, or in further combination with a dispersing agent and, in addition, an elastomeric block copolymer of a vinyl aromatic compound and an olefinic elastomer.

BACKGROUND OF THE INVENTION

The polyphenylene ethers are known and described in numerous publications including A. S. Hay, U.S. Pat. Nos. 3,306,874 and 3,306,875 and G. S. Stamatoff, U.S. Pat. Nos. 3,257,357 and 3,257,358. The high molecular weight polyphenylene ethers are high performance engineering thermoplastics possessing relatively high melt viscosities and softening points — i.e., in excess of 275° C., and are useful for many commercial applications requiring high temperature resistance including formation of films, fibers and molded articles.

Although they have the above-described desirable properties, it is also known that certain properties of the polyphenylene ether resins are undesirable for some commercial uses. For example, parts molded from the polyphenylene ethers are somewhat brittle due to poor impact strength. In addition, the relatively high melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered by combining them with other resins. For example, in E. P. Cizek, U.S. Pat. No. 3,383,435, there are provided means for simultaneously improving the melt processability of the polyphenylene ether resins while simultaneously upgrading many properties of polystyrene homopolymer and random copolymer resins. The invention of the Cizek patent is based upon the discovery that the polyphenylene ether resins and such polystyrene resins, including rubber modified polystyrene resins, are combinable in all proportions and result in compositions having many properties improved over those of either of the components.

One preferred embodiment of the Cizek patent is a composition comprising a high-impact, rubber reinforced polystyrene and a poly(2,6-dialkyl-1,4-phenylene)ether. This composition is preferred because it provides the aforementioned objectives of improving the melt processability properties of the polyphenylene ether resin and provides the further advantage of improving impact resistance of parts molded from the blend. Furthermore, the Cizek composition of the polyphenylene ether and the high impact polystyrene can be custom formulated to provide predetermined properties ranging between those of the polystyrene and those of the polyphenylene ether by controlling the ratio of the two polymers. The reason for this is that the composition exhibits a single set of thermodynamic properties rather than two distinct sets of properties — i.e., one for each of the components of the composition as is typical with compositions of prior art.

The styrene resins disclosed in the Cizek patent are either homopolymers or random copolymers. For example, the crystal polystyrenes of Examples 1 and 9 are homopolymers. Lustrex HT-88 of Example 7 is a commercial styrene grafted butadiene rubber made by a process in which the styrene is homopolymerized into side chains onto a rubber backbone. The styrene containing copolymer resins disclosed in Cizek, Col. 3, are random copolymers: styrene acrylonitrile, styrene butadiene, styrene-acrylonitrile-α-alkyl styrene copolymers, styrene-acrylonitrile-butadiene (ABS), copolymers of ethylvinyl benzene and divinyl benzene, and the like. With the exception of styrene-acrylonitrile-α-methyl styrene, Example 17, none of the Cizek terminology can be construed to disclose a block copolymer of the A-B-$A^1$ type. Because the monomers are grafted into terminal blocks, instead of side chains, A-B-$A^1$ block copolymers are more linear and their properties differ markedly from the grafted rubber copolymers used in Cizek. Moreover, because there is no disclosure of any copolymer with an elastomeric center block, the Cizek compositions do not include combinations of polyphenylene ethers with elastomeric block copolymers of vinyl aromatic compounds and conjugated dienes.

With respect to the preferred embodiments in the Cizek patent, it is believed that the impact resistance of the polyphenylene ether is improved because of the diene rubber content in the random grafted high-impact polystyrene and in the ABS resin and, in this respect, the improvement in impact strength appears to be directly proportional to the diene rubber content of the polystyrene resin or the ABS resin, increasing concentrations of diene rubber resulting in increased impact strength. However, it has also been found — as a disadvantage — that the gloss of parts molded from the polyphenylene ether resin and the high-impact polystyrene resin is inversely proportional to the diene rubber content and that, therefore, as the diene rubber content is increased, gloss and surface appearance of the molded parts are decreased. Consequently, increasing the diene rubber content of the compositions results in increased impact strength, but with a sacrifice in surface appearance and gloss. Alternatively, reduction in diene rubber content such as by the use of unreinforced (crystal) polystyrene results in parts having good gloss, but at a sacrifice in impact strengths. Because both impact strength and gloss are commercially important properties in the manufacture of molded parts, although the preferred compositions of the Cizek patent provide the advantages noted above, it has been found difficult to provide compositions having both optimum impact strength and surface appearance.

In addition, as mentioned above, the polyphenylene ether-styrene resin compositions of the Cizek patent were disclosed only to be improved in resistance to aggressive organic solvents, by copolymerization of the styrene resin with an alkenyl cyanide compound, e.g., acrylonitrile (Examples 10–12). Therefore, the need still exists for means to more easily provide compositions with outstanding resistance to gasoline.

In A. Katchman and R. M. Summers, U.S. Pat. No. 3,994,856, the discovery is reported that an elastomeric block copolymer of a vinyl aromatic compound (A) and (A)[1] and a conjugated diene (B), of the A-B-A[1] type, A and A[1] being the same or different, and the molecular weight of the center block being higher than that of the terminal blocks, will impart unexpectedly high impact strengths and chemical resistance properties both to polyphenylene ether resins and compositions of polyphenylene ether resins and polystyrene homopolymer and random copolymer resins. For example, a piece molded from a composition comprising 45 parts of polyphenylene ether resin, 13.0 parts of an elastomeric block copolymer of styrene-butadiene-styrene, 13.5 parts of a rubber modified high impact polystyrene resin and 28 parts of a crystal styrene homopolymer can be molded into a part with an Izod impact strength of 4.1 ft.lbs./in. notch and excellent resistance to a gasoline environment.

R. L. Lauchlan and G. A. Shaw, U.S. Pat. No. 3,660,531, disclose compositions of polyphenylene ether resins, polystyrene resins and elastomeric block copolymers having high impact strengths. However, compositions disclosed by Lauchlan et al have a polyphenylene ether-alkenyl aromatic resin matrix that constitutes greater than 50% of the composition, with a proviso that the ratio of polyphenylene ether resin to alkenyl aromatic resin is always greater than 1. Thus, the compositions have only limited use where the broad variations in composition ranges discovered by Cizek are to be exploited, especially at the lower ratios of polyphenylene ether to styrene resin. On the other hand, A. Katchman and R. M. Summers, French Patent Publication No. 2,160,963, have reported that such compositions including elastomeric block copolymers wherein the ratio of polyphenylene ether resin to alkenyl aromatic resin is less than 1, have a lower melt viscosity and are more stable than the Lauchlan type compositions. And, while the compositions of the French Specification have good impact strengths which make them useful for many molding applications, again, like Lauchlan, the broadest composition ranges, e.g., outside of 10/90 to 35/65 of polyphenylene ether and polystyrene, cannot be used and the amounts of elastomeric block copolymer needed, in some cases at least about 10% by weight, to obtain optimum impact properties, is still somewhat excessive.

In the copending, commonly assigned application of W. R. Haaf, Ser. No. 387,588, filed Aug. 13, 1973, the discovery is reported that a hydrogenated block copolymer of the A-B-A type wherein A designates a polymerized mono-alkenyl aromatic hydrocarbon block such as polystyrene and B designates a polymeric diene block which has had its unsaturation reduced by hydrogenation to less than 10% of the original unsaturation, will impart unexpectedly high impact strengths to polyphenylene ether resins and compositions of polyphenylene ether resins and polystyrene homopolymer and random copolymer resins. For example, a composition of 35 parts by weight of a polyphenylene ether resin, 50 parts by weight of a rubber-modified, high impact polystyrene resin and 15 parts of a block copolymer of the A-B-A type wherein B is an olefin rubber midblock, had an Izod impact strength of 9.1 ft.lbs./in. notch. Also compositions according to that discovery had high heat deflection temperatures, high Gardner impact resistance, high thermal oxidative resistance, uv stability, high surface gloss and good resistance to solvents such as gasoline.

With reference to the Haaf discovery, the advantages obtained by providing compositions of a hydrogenated block copolymer, e.g., of the A-B-A type with a polyphenylene ether resin alone or in combination with another resin, namely, improved ductility, better processability, increased ultraviolet and aging resistance, are due to the saturated characteristics of the block copolymer. In the case of a rubber modified polystyrene combination, the gloss will be slightly improved in comparison with products of the prior art.

The increase in impact strength is believed to be attributable to the particular structure of the chemically uncrosslinked elastomer in the matrix of a blend of polyphenylene ether and styrenic compound, causing micro layer morphology. Micro layers induce more deviatoric stress components in comparison to hydrostatic stress components, thus enhancing the contribution of a bulk flow deformation mechanism for the total deformation giving rise to a more ductile deformation.

A disadvantage of such a system is the large amounts of block copolymer needed in a polyphenylene ether-unmodified polystyrene blend to reach a reasonably high ductility level. This is especially true for compositions with high polystyrene content, as will be seen in the examples herein-after. To overcome this disadvantage, and also to promote the crazing deformation mechanism, a rubber modified polystyrene can be added. However, these kinds of interpolymerization copolymers normally possess graft indexes, i.e., the ratio % gel/% rubber, of about 2.5 and this means that a large volume of such toughened copolymers is occupied by soft gel particles which causes lower stiffness values and higher melt viscosities of the blends. Also, gloss is severly diminished by the incorporation of such gels.

It has now been discovered that the necessary crazing can be induced and controlled by another system than that using the grafted or blended rubber particles in modified polystyrene. A precompounded system (hereinafter (c)) comprising a saturated block copolymer with an olefinic resin, alone, or in further combination with a dispersing aid, blended with a polyphenylene ether resin or a composition of a polyphenylene ether resin and a polystyrene homopolymer or rubber modified polystyrene, will induce unexpectedly more stress whitening in tensile testing. However, impact resistance is poor, even at high precompound contents. As a result, it is unexpected to discover that a major improvement in formulating high impact strength compositions of (a) polyphenylene ethers and (b) styrene resins, e.g., styrene homopolymers and rubber modified high impact polystyrenes, can be achieved by the following new principle: To the composition is added a combination of the two impact modifiers, namely:

(c) a precompounded easily dispersible polymer system; and (d) a block copolymer having a vinyl aromatic olefinic-vinyl aromatic structure.

When the system (c) and (d) is used to improve impact properties of compositions of polyphenylene ether resins and polystyrene resins, results are achieved which go far beyond the results, in terms of impact strength, achieved either by compounding all components in one step or even making use of the more costly grafted polystyrene. Moreover, due to synergistic mechanisms, superior results follow from the use of the combination of (c) and (d) than would be predictable from (c) alone or (d) alone. Not only may the ratio of (a) to (b) be varied over the entire range from 1/99 to 99/1, but also lesser amounts of (b) than would be expected will still yield entirely adequate impact values.

It is believed that the surprising efficiency of the system is attributable to the special features of system (c). System (c) consists of a precompounded mixture of a vinyl aromatic-olefin-vinyl aromatic block copolymer and an olefinic resin, e.g., polyethylene, polypropylene, ethylene/propylene copolymers, and the like, at a ratio of 20/80 to 80/20, by weight. In any case, dispersibility in component (c) can be further improved by adding plasticizers and/or polystyrene, etc., as dispersing aids in an amount of up to 100 parts by weight of resinous components, and up to about 10% by weight of other dispersing aids, such as hydrocarbon resins can also be included.

The new compositions may also be reinforced, e.g., with fibrous glass, and rendered flame retardant with flame retardant additives to extend their field of use in molded products.

In comparison with the compositions of prior art, they will have higher stiffness and strength, excellent impact resistance, improved surface appearance, good resistance to aggressive solvents, excellent resistance to discoloration by heat and improved processability.

DESCRIPTION OF THE INVENTION

According to the present invention, there are provided high impact strength thermoplastic compositions comprising an intimate blend of:

(a) a polyphenylene ether resin; alone, or with (b) a styrene resin;

(c) a precompounded composition comprising from 80 to 20 parts by weight of an olefinic resin comprising polyethylene or a poly-α-olefin resin and correspondingly from 20 to 80 parts by weight of a linear, sequential or radial teleblock copolymer of a vinyl aromatic compound $(A)_n$ and $(A)_n^1$ and an olefinic elastomer (B), of the $A-B-A^1$; $A-(B-A-B)_n^{-A}$; $A(BA)_nB$; $(A)_4B$; $B(A)_4$; or $B[(AB)_nB]_4$ type, wherein n is an integer of 1 to 10; and (d) an elastomeric block copolymer of one of the types set forth in (c).

Preferred compositions will be those in which the polyphenylene ether resin component (a) comprises from 1 to 99 parts by weight and the styrene resin component (b) comprises from 99 to 1 parts by weight of the total weight of components (a) and (b).

Especially preferred compositions will be those in which components (a) and (b) together comprise from 99 to 75 parts by weight and components (c) and (d) together comprise from 1 to 25 parts by weight of the total weight of components (a), (b), (c) and (d). In particularly preferred compositions, component (c) comprises from 80 to 20 parts by weight and component (d) from 20 to 80 parts by weight of the total weight of (c) and (d).

In preferred compositions, the polyphenylene ether resins in component (a) will be selected from those having repeating structural units of the formula:

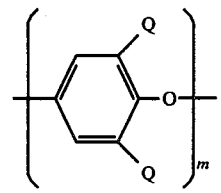

wherein the oxygen ether atom of one unit is connected to the benzene nucleus of the next adjoining unit; m is a positive integer and is at least 50; and each Q is a monovalent substitutent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the above-mentioned patents of Hay and Stamatoff. Especially preferred polyphenylene ether resins for purposes of the present invention are those having alkyl substitution in the two positions ortho to the oxygen ether atom — i.e., where each Q is alkyl, most preferably, having from 1 to 4 carbon atoms. The most preferred polyphenylene ether resin for purposes of the present invention is poly(2,6-dimethyl-1,4-phenylene)ether (each Q is methyl).

With respect to component (b), as is disclosed in the above-mentioned Cizek patent, the styrene resin most readily combinable with the polyphenylene ether resin is one having at least 25% by weight polymer units derived from vinyl aromatic monomer having the formula:

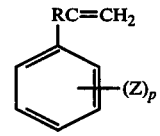

wherein R is hydrogen, alkyl of 1 to 4 carbon atoms or halogen; Z is a member selected from the class consisting of vinyl, hydrogen, or alkyl of from 1 to 4 carbon atoms; and p is from 1 to 5. The preferred resins for purposes of this invention is a polystyrene homopolymer or one comprising a rubber modified polystyrene, e.g., blended or grafted with from about 3 to 30, preferably, from 4 to 12% by weight of a polybutadiene or a rubbery random copolymer, e.g., of about 70% butadiene and 30% styrene.

With respect to components (c) and (d), the hydrogenated block copolymers are made by means known in the art and they are commercially available.

These materials are described in U.S. Pat. No. 3,431,323 to Jones, which is hereby incorporated by reference.

Prior to hydrogenation, the end blocks of these copolymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene, and the like, or mixtures thereof. The end blocks may be the same or different. The center block may be derived from, for example, polyisoprene or polybutadiene and may have a linear, sequential or teleradial structure.

The ratio of the copolymers and the average molecular weights can vary broadly although the molecular weight of center block should be greater than that of the combined terminal blocks. It is preferred to form terminal blocks A having average molecular weights of 4,000 to 115,000 and center block B, e.g., a hydrogenated polybutadiene block with an average molecular weight of 20,000 to 450,000. Still more preferably, the terminal blocks have average molecular weights of 8,000 to 60,000 while the hydrogenated polybutadiene polymer blocks has an average molecular weight between 50,000 and 300,000. The terminal blocks will preferably comprise 2 to 60% by weight, or more, preferably, 15 to 40% by weight, of the total block polymer. The preferred copolymers will be those formed from a copolymer having a hydrogenated/saturated polybutadiene center block wherein 5 to 55%, or more, preferably, 30 to 50% of the butadiene carbon atoms, are vinyl side chains.

The hydrogenated copolymers will have the average unsaturation reduced to less than 20% of the original value. It is preferred to have the unsaturation of the center block B reduced to 10%, or less, preferably, 5% of its original value.

The block copolymers are formed by techniques well known to those skilled in the art. Hydrogenation may be conducted utilizing a variety of hydrogenation catalysts such as nickel or kieselguhr, Raney nickel, copper chromate, molybdenum sulfide and finely divided platinum or other noble metals on a low surface area carrier.

Hydrogenation may be conducted at any desired temperature or pressure, from atmospheric to 300 psig, the usual range being between 100 and 1,000 psig at temperatures from 75° F. to 600° F. for times between 0.1 and 24 hours, preferably, from 0.2 to 8 hours.

Hydrogenated block copolymers such as Kraton G - 6500, Kraton G - 6521, Kraton G - 1650 and Kraton G - 1652 from Shell Chemical Company, Polymers Division, have been found useable according to the present invention. Kraton G - 1650 is preferred. Also useable are the so-called hydrogenated Solprenes of Phillips, especially the product designated Solprene - 512.

With respect to component (c), a variety of polyolefins can be used with the block copolymer to form the premix. In general, it is preferred to use polyethylene or a poly α-olefin or a copolymer of α-olefins, the α-olefin having from 3 to 8 carbon atoms. These can be made by known procedures and are readily available from a number of sources. Especially preferred are polyethylene or polypropylene and their copolymers and block copolymers.

The amount of elastomeric block copolymer, and polyolefins and dispersion aids combined, added to the polyphenylene ether resin and the styrene resin will vary from 1 to 35% by weight of the composition. The preferred composition will have less than 25% by weight of components (c) and (d) together based on (a), (b), (c) and (d). Obviously, if a rubber modified high impact polystyrene resin is used as component (b), then adequate minimum impact strengths can be achieved with a lower net concentration of the elastomeric block copolymer in any given composition.

As is mentioned above, other additives may be present in the compositions, such as plasticizers, pigments, flame retardants, and the like, in amounts varying between about 1 and 100 parts by weight of the total resinous components (a), (b), (c) and (d), in the composition. The above-stated ranges for amounts of the polyphenylene ether resin (a), the polystyrene resin (b), the precompounded blend of polyolefin and the elastomeric block copolymer resin (c) and the elastomer block copolymer resin (d), is based solely upon such resinous components in the polymer blend and excludes other additives.

Among the preferred features of this invention are reinforced compositions containing reinforcing amounts of reinforcements, such as powders, whiskers, fibers or platelets of metals, e.g., aluminum, bronze, iron or nickel, and non-metals, e.g., carbon filaments, acicular $CaSiO_3$, asbestos, $TiO_2$, titanate whiskers, glass flakes, and the like. Such reinforcements will be present in an amount of, e.g., 2 to 90% by weight, preferably 10 to 60% by weight. Especially preferred as a reinforcement is fibrous glass.

The plasticized embodiments in precompound (c) can use a conventional material in small amounts, e.g., 1 part up to 100 parts by weight based on the total weight of component (c). Preferably, the plasticizer will be a mineral oil, an ester of phosphoric acid or an ester of phthalic acid.

The phosphate plasticizer is preferably a compound of the formula:

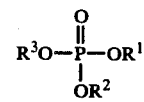

wherein $R^1$, $R^2$ and $R^3$ are the same or different, and are alkyl, cycloalkyl, aryl, alkyl substituted aryl, aryl substituted alkyl, hydroxyalkyl, hydroxyaryl, hydroxyalkaryl, halogen and hydrogen.

Examples include cresyl diphenyl phosphate, 2-ethylhexyl diphenyl phosphate, tricresyl phosphate, triisopropylphenyl phosphate, triphenyl phosphate, triethyl phosphate, dibutylphenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethyl-hexyl phenyl and tri-2-ethylhexyl phosphate, or mixtures thereof. Especially preferred is triphenyl phosphate.

The method of forming the polymer composition is not critical, so long as component (c) is precompounded. Any prior art blending technique is generally suitable. The preferred method comprises blending the polymers and additives, such as reinforcements in powder, granular and filamentous form — as the case may be — extruding the blend and chopping into pellets suitable for molding to shape by means conventionally used to mold normally solid thermoplastic compositions.

DESCRIPTION OF THE PREFERRED EMBODIMENTS

The advantages obtained by providing compositions of a polyphenylene ether resin, a polystyrene resin, a precompounded blend of a polyolefin with an elastomeric vinyl aromatic olefinic A-B-A[1] block copolymer, and an elastomeric vinyl aromatic conjugated A-B-A[1] block copolymer, are illustrated in the following exampples which are set forth as further description of the invention, but are not to be construed as limiting the invention thereto.

The following formulations are produced by a general procedure comprising mechanically blending then co-extruding in a twin screw Werner Pfleiderer (WP) extruder at 540° F. and molding into test pieces in a reciprocating screw injection molding machine at 500° to 580° F. (cylinder) and 170 to 210° F. (mold). In those compositions including component (c), part of the block copolymer and the olefinic resin are masterbatched by precompounding at 400° F. in a twin screw WP or adequate rubber processing machine first. The physical tests are carried out by the following procedures: notched Izod impact strength; falling dart impact tests on $\frac{1}{8}$" disc specimens; tensile strength and stiffness; heat distortion temperature; and apparent melt viscosity at 1500 sec.$^{-1}$ and 540° F. Formulations made and physical properties on molded pieces are as follows:

CONTROL EXPERIMENT A

| Component | Composition (parts by weight) | Experiment A |
|---|---|---|
| (a) | poly(2,6-dimethhyl-1,4-phenylene)ether[a] | 30 |
| (b) | crystal polystyrene resin[b] | 55 |
| (-) | | — |
| (d) | elastomeric block copolymer resin[c] | 15 |
| Properties | | |
| Izod impact (ft.lbs/in. notch) | | 3.4 |
| Falling dart impact (ft.lbs.) | | 30 |
| Tensile yield strength, (psi.) | | 7,800 |
| Tensile modulus, (psi.) | | 340,000 |
| Heat distortion temperature, 264 psi., ° F. | | 245 |
| Melt viscosity (poise) | | 1,700 |

[a]General Electric Company, powder form, intrinsic viscosity 0.4–0.5 dl./g.
[b]Hoechst Polystyrene crystal, clear, N 7000 V, 250,000 wt. average mol. wt.
[c]Shell Kraton G-1650, styrene-ethylene-butylene-styrene block copolymer.

No precompounded component (c) is present, and phase separation caused by delamination is noted in the molded bar when broken.

CONTROL EXPERIMENT B

The following formulation is blended, molded and tested by the general procedure. Blending, molding and property test data are as follows:

| Component | Composition (parts by weight) | Experiment B | |
|---|---|---|---|
| (a) | poly(2,6-dimethyl-1,4-phenylene)ether (as in Experiment A) | 30 | |
| (b) | crystal polystyrene resin (as in Experiment A) | 55 | |
| (c) | polypropylene resin[a] (precompounded with) | 3.0 | |
| (c¹) | block copolymer resin (as in Experiment A) and | 6.0 | 15.0 |
| (c²) | mineral oil[b] | 6.0 | |
| (-) | | — | |
| Properties | | | |
| Izod impact (ft.lbs./in. notch) | | 0.8 | |
| Falling dart impact (ft.lbs.) | | 25 | |
| Tensile yield strength, (psi.) | | 5,700 | |
| Tensile modulus, (psi.) | | 360,000 | |
| Heat distortion temperature, 264 psi., ° F. | | 215 | |
| Melt viscosity (poise) | | 1,400 | |

[a]Shell KM 6100 polypropylene, Melt Index 5.6
[b]Esso primol 342, b.p. 320° C.

No unprecompounded block copolymer component (d) is present, and the impact strength is low.

EXAMPLE 1

The following formulation is blended, molded and tested by the general procedure:

| Component | Composition (parts by weight) | Example 1 | |
|---|---|---|---|
| (a) | poly(2,6-dimethyl-1,4-phenylene)ether (as in Experiment A) | 30 | |
| (b) | crystal polystyrene resin (as in Experiment A) | 55 | |
| (c) | polypropylene resin (as in Experiment B) (precompounded with) | 1.5 | |
| (c¹) | elastomeric block copolymer resin (as in Experiment B) and | 3.0 | 7.5 |
| (c²) | mineral oil (as in Experiment B) | 3.0 | |
| (d) | elastomeric block copolymer resin (as in Experiment A) | 7.5 | |
| Properties | | | |
| Izod impact (ft.lbs/in. notch) | | 5.5 | |
| Falling dart impact (ft.lbs.) | | 45 | |
| Tensile yield strength, (psi.) | | 5,900 | |
| Tensile modulus, (psi.) | | 380,000 | |
| Heat distoration temperature, psi. ° F. | | 220 | |
| Melt viscosity (poise) | | 1,400 | |

In addition to having remarkably high impact strength, the composition according to this invention provided molded articles with excellent surface appearance.

Obviously, other modifications are possible in light of the above detailed example, e.g., by substituting for the crystal polystyrene resin, a rubber modified high impact polystyrene resin, or a rubbery butadiene modified or EPDM modified polystyrene, compositions according to this invention will be obtained.

EXAMPLE 2

The following formulation is blended, molded and tested by the general procedure:

| Component | Composition (parts by weight) | Example 2 | |
|---|---|---|---|
| (a) | poly(2,6-dimethyl-1,4-phenylene)-ether (as in Experiment A) | 30 | |
| (b) | crystal polystyrene resin (as in Experiment A) | 47.5 | |
| (c) | polypropylene resin (as in Experiment B) (precompounded with) | 2.5 | 15.0 |
| (c¹) | block copolymer resin (as in Experiment A) (and with) | 5.0 | |
| (c²) | crystal polystyrene resin (as in Experiment A) | 7.5 | |
| (d) | block copolymer resin (as in Experiment A) | 7.5 | |
| Properties | | | |
| Izod impact (ft.lbs./in. notch) | | 5.5 | |
| Falling dart impact (ft. lbs.) | | 60 | |
| Tensile yield strength, (psi.) | | 8,100 | |
| Tensile modulus, (psi.) | | 300,000 | |
| Heat distortion temperature, 264 psi., ° F. | | 245 | |
| Melt viscosity (poise) | | 1,800 | |

It is to be noted that the heat distortion temperature is increased to 245° F. by the substitution of polystyrene resin for the mineral oil as the dispersing agent (c²) in the premix. Processing temperatures can be higher also, even to 625° F. The impact strength and surface appearance are remarkable.

EXAMPLE 3

The following formulation is blended, molded and tested by the general procedure:

| Component | Example Composition (parts by weight) | 3 |
|---|---|---|
| (a) | poly(2,6-dimethyl-1,4-phenylene)-ether (as in Experiment A) | 45 |
| (b) | crystal polystyrene resin (as in Experiment A) | 32.5 |
| (c) | polypropylene resin (as in Experiment B) (precompounded with) | 2.5 |
| (c¹) | block copolymer resin (as in Experiment A) (and with) | 5.0 |
| (c²) | crystal polystyrene resin (as in Experiment A) | 7.5 |
| (d) | block copolymer resin (as in Experiment A) | 7.5 |

{ (c), (c¹), (c²) bracketed together = 15.0 }

| Properties | |
|---|---|
| Izod impact (ft.lbs./in. notch) | 9.5 |
| Falling dart impact (ft.lbs.) | 100 |
| Tensile yield strength, (psi.) | 9,000 |
| Tensile modulus, (psi.) | 300,000 |
| Heat distortion temperature, 264 psi., °F. | 270 |
| Melt viscosity (poise) | 2,900 |

Increasing the polyphenylene ether (a) content of the composition causes a substantial increase in impact strength.

EXAMPLES 4–5

The following formulations are blended, molded and tested by the general procedure:

EXAMPLE

| Component | Composition (parts by weight) | 4 | 5 |
|---|---|---|---|
| (a) | poly(2,6-dimethyl-1,4-phenylene) ether (as in Experiment A) | 45 | 60 |
| (b) | crystal polystyrene resin (as in Experiment A) | 40 | 25 |
| (c) | polypropylene-polyethylene sequential copolymer[a] (precompounded with) | 2.5 | 2.5 |
| (c¹) | block copolymer resin (as in Experiment A) | 5.0 | 5.0 |
| (d) | block copolymer resin (as in Experiment A) | 7.5 | 7.5 |
| Properties | | | |
| Izod impact (ft.lbs./in. notch) | | 10.5 | 11.5 |
| Falling dart impact (ft.lbs.) | | 100 | 120 |
| Tensile yield strength, (psi.) | | 7,500 | 8,000 |
| Tensile modulus, (psi.) | | 350,000 | 340,000 |
| Heat distortion temperature, 264 psi., °F. | | 265 | 300 |
| Melt viscosity (poise) | | 2,100 | 5,300 |

[a] Hüls copolymer, designated No. 7200

EXAMPLE 6

The following formulation is blended, molded and tested by the general procedure:

| Component | Example Composition (parts by weight) | 6 |
|---|---|---|
| (a) | poly(2,6-dimethyl-1,4-phenylene)-ether (as in Experiment A) | 73 |
| (b) | triphenyl phosphate | 12 |
| (c) | polypropylene-polyethylene block copolymer (as in Example 4) (precompounded with) | 2.5 |
| (c¹) | block copolymer resin (as in Experiment A) | 5.0 |
| (d) | block copolymer resin (as in Experiment A) | 7.5 |

| Properties | |
|---|---|
| Izod impact (ft.lbs./in. notch) | 12 |
| Falling dart impact (ft.lbs.) | 120 |
| Tensile yield strength, (psi.) | 7,000 |
| Tensile modulus, (psi.) | 280,000 |
| Heat distortion temperature, psi. °F. | 265 |
| Melt viscosity (poise) | 3,800 |
| Flame retardancy, UL 94, 1/16″ thick | V-O |

This demonstrates that polyphenylene ether can be used without a styrene as component (b) and still a very high impact composition is obtained.

The procedure of Example 1 can also be repeated, substituting for the block copolymer of polystyrene-polyolefin-polystyrene, respectively, hydrogenated block copolymers of polystyrene-polybutadiene-polystyrene, polystyrene-polyisoprene-polystyrene, polystyrene-polyisoprene-poly-(α-methylstyrene) and high impact compositions according to this invention can be obtained.

The procedure of Example 1 can be repeated substituting polyethylene or ethylene-propylene copolymers for the polypropylene and compositions according to this invention will be obtained.

Furthermore, the poly(2,6-dimethyl-1,4-phenylene)ether can be replaced with the following in the formulations of Example 1:

poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether;
poly(2-ethyl-6-propyl-1,4-phenylene)ether to obtain compositions according to this invention.

The procedure of Example 2 can be repeated and 50 parts by weight, respectively, of white mineral oil and of triphenyl phosphate based on the combined weights of component (c) and (c¹) can be included to obtain plasticized compositions according to this invention.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A high impact strength thermoplastic composition comprising an intimate blend of:
   (a) a polyphenylene ether resin, alone; or combined with
   (b) a styrene resin;
   (c) a precompounded composition comprising from 80 to 20 parts by weight of an olefinic resin comprising polyethylene or a poly-α-olefin resin, alone or in further combination with a minor, effective amount of a dispersing aid, and correspondingly from 20 to 80 parts by weight of a linear, sequential or radial teleblock copolymer of a vinyl aromatic compound $(A)_n$ and $(A)1/n$ and an olefinic elastomer (B), of the $A-B-A^1$; $A-(B-A-B)_n-A$; $A(BA)_nB$; $(A)_4B$; $B(A)_4$; or $B[(AB)_nB]_4$ type, wherein n is an integer of from 1 to 10 obtained by the hydrogenation of a conjugated diene polymer; and
   (d) an elastomeric block copolymer of one of the types set forth in (c).

2. A composition as defined in claim 1 wherein said polyphenylene ether resin component (a) comprises from 1 to 99 parts by weight and styrene resin component (b) comprises from 99 to 1 parts by weight of the total weight of components (a) and (b).

3. A composition as defined in claim 1 wherein components (a) and (b) together comprise from 99 to 75 parts by weight and components (c) and (d) together comprise from 1 to 25 parts by weight of the total weight of components (a), (b), (c) and (d).

4. A composition as defined in claim 1 wherein component (c) comprises from 80 to 20 parts by weight and component (d) from 20 to 80 parts by weight of the total weight of (c) and (d).

5. A composition as defined in claim 1 wherein component (a) is a polyphenylene ether of the formula:

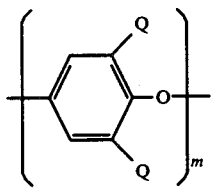

wherein the oxygen ether atom of one unit is connected to the benzene nucleus of the next adjoining unit; m is an integer of at least 50; and each Q is a monovalent substitutent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

6. A composition as defined in claim 5 wherein each Q is alkyl having from 1 to 4 carbon atoms.

7. A composition as defined in claim 6 wherein each Q is methyl.

8. A composition as defined in claim 1 wherein component (b) is a styrene resin having at least 25% of the polymer units derived from a vinyl aromatic compound of the formula:

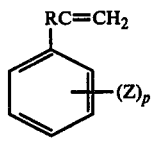

wherein R is hydrogen, alkyl of from 1 to 4 carbon atoms or halogen; Z is hydrogen, alkyl of from 1 to 4 carbon atoms or vinyl; and p is an integer of from 1 to 5.

9. A composition as defined in claim 8 wherein styrene resin is a styrene homopolymer resin or a rubber modified high impact styrene resin wherein the rubber comprises a diene or olefinic rubber or a rubbery copolymer of butadiene and styrene in an amount of from about 4 to about 12% by weight of said resin.

10. A composition as defined in claim 1 wherein, in components (c) and (d), (A) and (A)$^1$ are selected from styrene, α-methyl styrene, vinyl toluene, vinyl xylene and vinyl naphthalene and (B) is selected from butadiene, isoprene, 1,3-pentadiene or 2,3-dimethylbutadiene.

11. A composition as defined in claim 10 wherein, in components (c) and (d), (A) is a styrene block, (B) is an olefin block, and (A)$^1$ is a styrene block.

12. A composition as defined in claim 11 wherein, in components (c) and (d), terminal blocks (A) and (A)$^1$ have molecular weights of 2,000 to 100,000, respectively, and center block (B) has a molecular weight of from 25,000 to 1,000,000.

13. A composition as defined in claim 1 wherein, in component (c), said olefinic resin is polyethylene.

14. A composition as defined in claim 1 wherein, in component (c), said olefinic resin is polypropylene.

15. A composition as defined in claim 1 wherein, in component (c), the dispersing aids are selected from hydrocarbon resins, mineral oil, an ester of phosphoric acid, an ester of phthalic acid, a styrene homopolymer or a combination of any of the foregoing.

16. A reinforced composition as defined in claim 1 including a reinforcing amount of a reinforcing filler.

17. A composition as defined in claim 15 wherein said reinforcing agent comprises glass fibers.

18. A composition as defined in claim 1 which also includes at least a small, effective amount of a plasticizer.

19. A composition as defined in claim 18 wherein said plasticizer comprises an ester of phosphoric acid.

20. A composition as defined in claim 19 wherein said plasticizer is triphenyl phosphate.

21. A composition as defined in claim 1 which is flame retardant.

* * * * *

UNITED STATES PATENT AND TRADEMARK OFFICE
CERTIFICATE OF CORRECTION

PATENT NO. : 4,145,377
DATED : March 20, 1979
INVENTOR(S) : Jan Bussink and Johannes W.J. de Munck It is certified that error appears in the above-identified patent and that said Letters Patent are hereby corrected as shown below:

Column 4, line 27, "herein-after" should read
-- hereinafter --.

Column 9, line 26, "(2,6-dimethhyl-1,4-" should read
-- (2,6-dimethyl-1,4- --.

Column 10, line 24, "distoration" should read
-- distortion --.

Column 10, under EXAMPLE 2, the brackets in the chart should not extend from (b) to ($c^2$) but from (c) to ($c^2$).

Column 11, under EXAMPLE 3, the brackets in the chart should not extend from (b) to ($c^2$) but from (c) to ($c^2$).

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*